US012649870B2

(12) United States Patent
Tsuchibuchi et al.

(10) Patent No.: US 12,649,870 B2
(45) Date of Patent: Jun. 9, 2026

(54) SUBSTRATE FOR RELEASE SHEETS, AND RELEASE SHEET

(71) Applicant: LINTEC CORPORATION, Itabashi-ku (JP)

(72) Inventors: Koji Tsuchibuchi, Itabashi-ku (JP); Kiichiro Kato, Itabashi-ku (JP)

(73) Assignee: LINTEC CORPORATION, Itabashi-ku (JP)

( * ) Notice: Subject to any disclaimer, the term of this patent is extended or adjusted under 35 U.S.C. 154(b) by 1247 days.

(21) Appl. No.: 16/980,628

(22) PCT Filed: Mar. 13, 2019

(86) PCT No.: PCT/JP2019/010370
§ 371 (c)(1),
(2) Date: Sep. 14, 2020

(87) PCT Pub. No.: WO2019/177057
PCT Pub. Date: Sep. 19, 2019

(65) Prior Publication Data
US 2021/0008833 A1      Jan. 14, 2021

(30) Foreign Application Priority Data

Mar. 15, 2018     (JP) ................................. 2018-048548

(51) Int. Cl.
*C09J 7/40*          (2018.01)
*B32B 3/26*          (2006.01)
(Continued)

(52) U.S. Cl.
CPC ................. *C09J 7/405* (2018.01); *B32B 3/26* (2013.01); *B32B 3/30* (2013.01); *B32B 7/12* (2013.01);
(Continued)

(58) Field of Classification Search
None
See application file for complete search history.

(56) References Cited

U.S. PATENT DOCUMENTS

| | | | | |
|---|---|---|---|---|
| 5,650,215 A | * | 7/1997 | Mazurek | ..................... C09J 7/38 428/156 |
| 6,984,427 B2 | * | 1/2006 | Galkiewicz | .............. C09J 7/403 428/41.5 |

(Continued)

FOREIGN PATENT DOCUMENTS

| | | | |
|---|---|---|---|
| JP | 06212131 A | * | 8/1994 |
| JP | 2003-145660 A | | 5/2003 |

(Continued)

OTHER PUBLICATIONS

Machine translation of JP 2006116718 A (Year: 2006).*

(Continued)

*Primary Examiner* — Frank D Ducheneaux
(74) *Attorney, Agent, or Firm* — Oblon, McClelland, Maier & Neustadt, L.L.P.

(57) ABSTRACT
A substrate may be suitable for release sheet and may include, in this order, a support, an adhesion layer (X1), and a resin layer (Y1) containing polyethylene having a density of 930 kg/m$^3$ or more and 960 kg/m$^3$ or less, wherein convex portions are present on the surface of the resin layer (Y1). A difference in height of the convex portions may be 0.5 μm or more.

20 Claims, 4 Drawing Sheets

(51) Int. Cl.

| | |
|---|---|
| *B32B 3/30* | (2006.01) |
| *B32B 7/12* | (2006.01) |
| *B32B 27/32* | (2006.01) |
| *B32B 37/04* | (2006.01) |
| *B32B 37/15* | (2006.01) |
| *C09J 123/08* | (2006.01) |
| *B32B 37/00* | (2006.01) |
| *B32B 38/18* | (2006.01) |

(52) U.S. Cl.

CPC .............. *B32B 27/32* (2013.01); *B32B 37/04* (2013.01); *C09J 7/40* (2018.01); *C09J 123/08* (2013.01); *C09J 123/0846* (2013.01); *B32B 37/156* (2013.01); *B32B 38/1866* (2013.01); *B32B 2250/05* (2013.01); *B32B 2307/7376* (2023.05); *B32B 2307/748* (2013.01); *B32B 2323/04* (2013.01); *B32B 2323/043* (2013.01); *B32B 2323/046* (2013.01); *C09J 2203/31* (2013.01); *C09J 2301/122* (2020.08); *C09J 2301/124* (2020.08); *C09J 2301/302* (2020.08); *C09J 2423/04* (2013.01); *C09J 2423/045* (2013.01); *C09J 2433/00* (2013.01); *C09J 2483/005* (2013.01)

(56) References Cited

U.S. PATENT DOCUMENTS

| | | | | |
|---|---|---|---|---|
| 11,110,690 B2 * | 9/2021 | Hansen | .................... | B32B 27/18 |
| 2005/0266195 A1 * | 12/2005 | Nonaka | .................... | C09J 7/403 |
| | | | | 428/141 |

FOREIGN PATENT DOCUMENTS

| | | | |
|---|---|---|---|
| JP | 2005-350650 | A | 12/2005 |
| JP | 2006-116718 | A | 5/2006 |
| JP | 2008-285684 | A | 11/2008 |
| JP | 2010-180271 | A | 8/2010 |
| JP | 2014-148646 | A | 8/2014 |

OTHER PUBLICATIONS

Machine translation of JP-06212131-A (Year: 1994).*
International Search Report issued on Apr. 9, 2019 in PCT/JP2019/010370 filed on Mar. 13, 2019, 1 page.

* cited by examiner

SUBSTRATE FOR RELEASE SHEETS, AND RELEASE SHEET

CROSS-REFERENCE TO RELATED APPLICATIONS

The present application is the national stage of international application PCT/JP2019/010370, filed on Mar. 13, 2019, and claims the benefit of the filing date of Japanese Appl. No. 2018-048548, filed on Mar. 15, 2018.

TECHNICAL FIELD

The present invention relates to a substrate for release sheet and a release sheet including the substrate for release sheet.

BACKGROUND ART

A general pressure sensitive adhesive sheet is constituted of a substrate, a pressure sensitive adhesive layer formed on the substrate, and a release material which is optionally provided on the pressure sensitive adhesive layer. On the occasion of its use, in the case where the release material is provided, the release material is peeled off, and the pressure sensitive adhesive layer is brought into contact with an adherend and stuck thereonto.

Now, as for a pressure sensitive adhesive sheet having a large sticking area, which is, for example, used for discrimination use, decoration use, paint masking use, surface protection use of a metal plate or the like, and so on, there is involved such a problem that on the occasion of sticking onto the adherend, an air trap is liable to be produced between the pressure sensitive adhesive layer and the adherend, and the subject portion becomes "blister" to impair the appearance.

As one of methods for solving such a problem, there is adopted a method in which by using a pressure sensitive adhesive sheet having fine concaves (grooves) on the surface of the pressure sensitive adhesive layer of the pressure sensitive adhesive sheet, the air trap existing between the pressure sensitive adhesive layer and the adherend is discharged to the outside of the pressure sensitive adhesive sheet via the concaves, thereby preventing the "blister" from occurring.

Then, as one example of a method for producing such a pressure sensitive adhesive sheet, there is known a method in which a release sheet having convex portions on a release-treated layer is used, an pressure sensitive adhesive layer for obtaining a desired pressure sensitive adhesive sheet is formed on the surface of the release-treated layer of the release sheet, and the shape of convex portion on the release-treated layer is transferred onto the pressure sensitive adhesive layer, thereby forming the concave portions on the pressure sensitive adhesive layer.

For example, PTLs 1 and 2 disclose a release liner having a fine embossed pattern, which is used for forming fine grooves on the adhesive surface.

CITATION LIST

Patent Literature

PTL 1: JP 2003-145660 A
PTL 2: JP 2008-285684 A

SUMMARY OF INVENTION

Technical Problem

PTLs 1 and 2 disclose that as the aforementioned release liner, polyethylene coated papers having commercially available silicone release coatings, polyethylene terephthalate films having commercially available silicone release coatings, or cast polypropylene films which can be embossed with, a pattern(s) during producing such films and then coated with commercially available silicone release coatings, can be used for the release liner. In addition, there is also disclosed a release liner produced by embossing a release liner consisting of four layers in which a polyethylene terephthalate film is used as a core, a polyethylene layer is provided on the both surfaces of this film, and one surface of the polyethylene layer is provided with a silicone release coating.

However, in a laminate in which a resin layer is provided as a single layer on a support as in the release sheet disclosed in PTLs 1 and 2, in the case where convex portions are formed on the surface of the resin layer or the surface of the release agent layer by a method, such as embossing, a peeling trace is occasionally generated on the surface of the obtained substrate for release sheet or the surface of the release sheet depending on the kind of the resin to be used for the resin layer.

It may be considered that the generation of a peeling trace is caused due to the fact that the support and the resin layer are partially peeled off from each other, and as a result, the peeling trace comes up to the surface of the resin layer having convex portions of the obtained substrate for release sheet or the surface of the release agent layer of the release sheet. Then, in the case where the substrate for release sheet in which the peeling trace is generated on the surface of the resin layer having convex portions is used, and the release agent is coated on the surface of the resin layer to fabricate the release sheet, it was confirmed that the peeling trace comes up to the surface of the release agent layer of the obtained release sheet as well.

When a peeling trace is generated on the substrate for release sheet or the surface of the release agent layer of the release sheet (the foregoing peeling trace will be hereinafter also referred to simply as "peeling trace"), there is a concern that the peeling trace is transferred onto the surface of an object, onto which the release agent layer of the release sheet (including the aforementioned pressure sensitive adhesive layer) is stuck, coming into contact with the release agent layer, whereby characteristics of the object, such as occurrence of an appearance failure of the object, cannot be thoroughly exhibited.

In addition, in the case of the pressure sensitive adhesive sheet that is used for preventing the "blister" in the aforementioned mode from occurring, a structure of the surface of the pressure sensitive adhesive layer provided for the purpose of discharging the aforementioned air occasionally comes up to the surface of the substrate on the opposite side to the surface of the pressure sensitive adhesive layer. Therefore, in order that the appearance of the pressure sensitive adhesive sheet on the occasion of being stuck onto the adherend may be made more beautiful, it is required to provide a finer concave-convex structure or groove structure on the pressure sensitive adhesive layer, or to prevent transfer of an unintended shape, such as the peeling trace, from occurring. In order to reduce a risk likely affecting the characteristics of the pressure sensitive adhesive sheet, such as pressure sensitive adhesive characteristics, inclusive of the appearance, it is desired that an unintended shape derived from the peeling trace or the like is not generated.

Similarly, even in other field where the release sheet is used, it is desired that an unintended shape, such as the peeling trace, is not generated on the surface of the release agent layer of the release sheet to be used, such that an unintended fault is not generated relative to the adherend onto which the release sheet is stuck.

From the foregoing viewpoint, a release sheet in which the aforementioned peeling trace is not generated even on the surface of the release agent layer of the obtained release sheet, and a substrate for release sheet, which is used for the foregoing release sheet, are demanded.

In consequence, an object of the present invention is to provide a substrate for release sheet capable of inhibiting a peeling trace generated on the surface of a release agent layer of the obtained release sheet and a release sheet including the substrate for release sheet.

Solution to Problem

The present inventors have found that the aforementioned problem can be solved by a substrate for release sheet including a support, an adhesion layer (X1), and a resin layer (Y1) containing a specified resin in this order, wherein convex portions having a difference in height of 0.5 µm or more are present on the surface of the resin layer (Y1), thereby leading to accomplishment of the present invention.

Specifically, the present invention provides the following [1] to [10].

[1] A substrate for release sheet including a support, an adhesion layer (X1), and a resin layer (Y1) containing polyethylene having a density of 930 kg/m$^3$ or more and 960 kg/m$^3$ or less in this order, wherein convex portions are present on the surface of the resin layer (Y1), and a difference in height of the convex portions is 0.5 µm or more.

[2] The substrate for release sheet as set forth in the above [1], wherein the adhesion layer (X1) contains at least one selected from polyethylene having a density of 900 kg/m$^3$ or more and less than 930 kg/m$^3$ and a polar site-containing polyolefin.

[3] The substrate for release sheet as set forth in the above [2], wherein the polar site is derived from at least one selected from the group consisting of methacrylic acid, acrylic acid, methyl methacrylate, methyl acrylate, maleic acid, maleic anhydride, and vinyl acetate.

[4] The substrate for release sheet as set forth in any of the above [1] to [3], wherein the thickness of the adhesion layer (X1) is 1 µm or more and 50 µm or less.

[5] The substrate for release sheet as set forth in any of the above [1] to [4], wherein the difference in height of the convex portions is 5.0 µm or more and 18.0 µm or less.

[6] The substrate for release sheet as set forth in any of the above [1] to [5], wherein a value of a ratio [X1/Y1] of the thickness of the adhesion layer (X1) to the thickness of the resin layer (Y1) is 0.02 or more and 10.00 or less.

[7] The substrate for release sheet as set forth in any of the above [1] to [6], further including an adhesion layer (X2) and a resin layer (Y2) in this order on the opposite side of the support to the resin layer (Y1).

[8] A release sheet further including a release agent layer (Z) on the resin layer (Y1) on the opposite side to the support of the substrate for release sheet as set forth in any of the above [1] to [7].

[9 ] The release sheet as set forth in the above [8], wherein convex portions are present on the surface of the release agent layer (Z), and a difference in height of the convex portions is 0.5 µm or more.

[10] A method for producing the substrate for release sheet as set forth in any of the above [1] to [7], the method including at least a step (2) of forming a layer serving as the resin layer (Y1) containing polyethylene having a density of 930 kg/m$^3$ or more and 960 kg/m$^3$ or less by a melt extrusion method and pressing the surface of the layer serving as the resin layer (Y1) onto the surface of an embossing roll to form convex portions having a difference in height of 0.5 µm or more on the surface of the layer serving as the resin layer (Y1), thereby forming the resin layer (Y1).

Advantageous Effects of Invention

In accordance with the present invention, it is possible to provide a substrate for release sheet capable of inhibiting a peeling trace generated on the surface of a release agent layer of the obtained release sheet and a release sheet including the substrate for release sheet.

DESCRIPTION OF EMBODIMENTS

[Substrate for Release Sheet]

The substrate for release sheet of the present invention is a substrate for release sheet including a support, an adhesion layer (X1) (hereinafter also referred to simply as "layer (X1)"), and a resin layer (Y1) containing polyethylene having a density of 930 kg/m³ or more and 960 kg/m³ or less (hereinafter also referred to simply as "layer (Y1)") in this order, wherein convex portions are present on the surface of the resin layer (Y1), and a difference in height of the convex portions is 0.5 μm or more.

An example of the substrate for release sheet according to the embodiment of the present invention is hereunder described by reference to FIG. 1 and FIG. 2, but it should be construed that the substrate for release sheet of the present invention is not limited to the following examples so long as the effects of the present invention are revealed.

Figure 1:
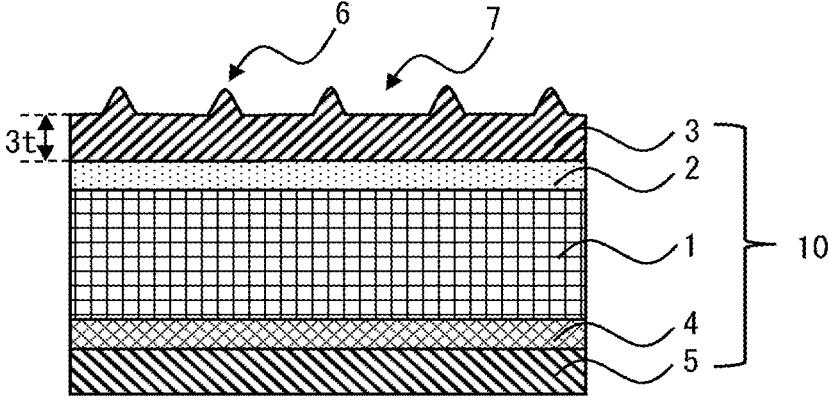
FIG. 1 is a cross-sectional schematic view illustrating an example of the constitution of the substrate for release sheet of the present invention, which is a cross-sectional schematic view of the substrate for release sheet cut on a surface such that the convex portions present on the surface of the resin layer (Y1) can be discriminated.

FIG. 1 is a cross-sectional schematic view of a substrate 10 for release sheet illustrating an example of the constitution of the substrate for release sheet of the present invention, which is a cross-sectional schematic view cut on a surface such that convex portions 6 present on the surface of a resin layer (Y1) 3 can be discriminated.

Figure 2:
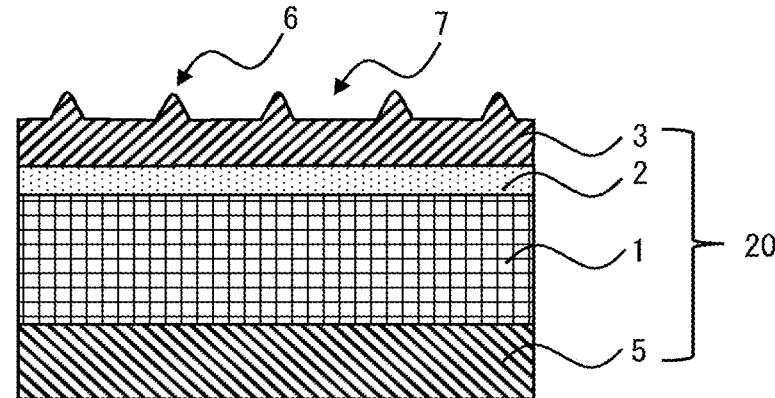
FIG. 2 is a cross-sectional schematic view illustrating an example of the constitution of the substrate for release sheet of the present invention, which is a cross-sectional schematic view of the substrate for release sheet cut on a surface such that the convex portions present on the surface of the resin layer (Y1) can be discriminated.

FIG. 2 is a cross-sectional schematic view of a substrate 20 for release sheet illustrating an example of the constitution of the substrate for release sheet of the present invention, which is a cross-sectional schematic view cut on a surface such that convex portions 6 present on the surface of a resin layer (Y1) 3 can be discriminated.

Figures 4, 5:
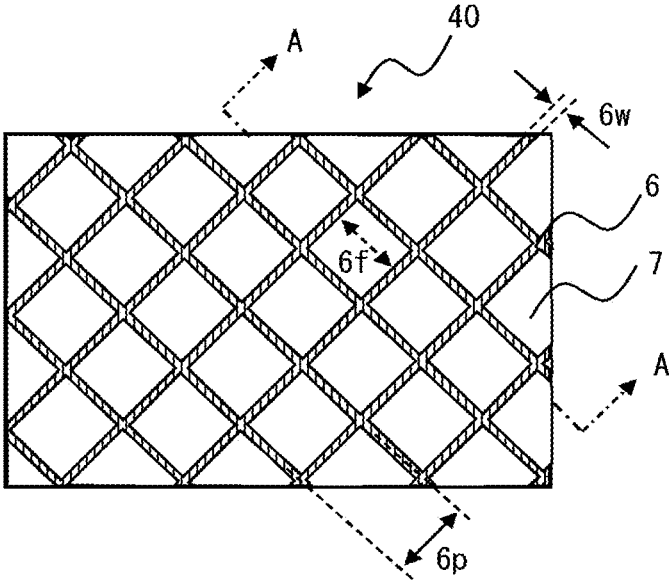
FIG. 4 is a schematic plan view illustrating an example of the substrate for release sheet of the present invention.
FIG. 5 is a schematic plan view illustrating an example of the substrate for release sheet of the present invention.

For example, with respect to a substrate 40 for release sheet that is an example of the constitution of the substrate for release sheet of the present invention illustrated in a schematic plan view of FIG. 5, when cut by an A-A line, the cross-sectional view as illustrated in FIG. 1 or FIG. 2 is obtained.

As for the substrate for release sheet of the present invention, there is exemplified a structure as in the substrate 10 for release sheet illustrated in FIG. 1 or the substrate 20 for release sheet illustrated in FIG. 2, in which a support 1, an adhesion layer (X1) 2, and a resin layer (Y1) 3 having convex portions 6 are laminated in this order. In the constitution of the substrate for release sheet of the present invention, it is preferred that the support 1, the adhesion layer (X1) 2, and the resin layer (Y1) 3 are directly laminated in this order as illustrated in FIG. 1 or FIG. 2. For example, as illustrated in FIG. 1 or FIG. 2, parts in which no convex portion is present relative to the convex portions 6 included in the resin layer (Y1) are sometimes referred to as "concave portions 7" relatively included in the rein layer (Y1).

Here, for example, in the case of the substrate 10 for release sheet illustrated in FIG. 1, the "direction lamination" indicates a constitution in which the three layers of the support 1, the adhesion layer (X1) 2, and the resin layer (Y1) 3 come into direct contact with each other without including any other layers thereamong.

In the case of a mode as in the substrate 10 for release layer illustrated in FIG. 1, from the viewpoint that the generation of a curl of the substrate for release sheet can be inhibited, the substrate for release sheet of the present invention may be a mode further including an adhesion layer (X2) 4 and a resin layer (Y2) 5 in this order on the opposite side of the support 1 to the resin layer (Y1) 3. In the case of this mode, it is preferred that the support 1, the adhesion layer (X2) 4, and the resin layer (Y2) 5 are directly laminated in this order.

In addition, in the case of a mode as in the substrate 20 for release layer illustrated in FIG. 2, from the viewpoint that the generation of a curl of the substrate for release sheet can be inhibited, the substrate for release sheet of the present invention may be a mode further including the resin layer (Y2) 5 on the opposite side of the support 1 to the resin layer (Y1) 3. In the case of this mode, it is preferred that the support 1 and the resin layer (Y2) 5 are directly laminated in this order.

As mentioned above, the constitution of the substrate for release sheet of the present invention is not particularly limited so long as it is a constitution including the support, the adhesion layer (X1), and the resin layer (Y1) in this order. However, from the viewpoint that the generation of a curl of the substrate for release sheet can be inhibited, a constitution including at least the resin layer (Y2) on the opposite side of the support to the resin layer (Y1) is preferred; and a constitution further including the adhesion (X2) and the resin layer (Y2) in this order on the opposite side of the support to the resin layer (Y1) is more preferred.

Each of the layers included in the substrate for release sheet of the present invention is hereunder described.

In this specification, regarding a preferred numerical value range (for example, a range of content or the like), a lower limit value and an upper limit value that are expressed in stages can be combined each independently. For example, from an expression of "preferably 10 or more, and more preferably 30 or more, and preferably 90 or less, and more preferably 60 or less", by combining the "preferred lower limit value (10)" and the "more preferred upper limit value (60)", a suitable range can also be conceived as "10 or more and 60 or less". Similarly, from an expression of "preferably 10 to 90, and more preferably 30 to 60", a suitable range can also be conceived as "10 to 60". In the case where a preferred numerical value range is merely expressed as "10 to 90", it should be construed that the range of 10 or more and 90 or less is expressed unless otherwise indicated.

<Support>

Examples of the support include paper substrates, such as tissue paper, wood containing paper, wood-free paper, impregnated paper, coat paper, art paper, vegetable parchment, glassine paper, and lint-free paper; plastic films, such as polyester films made of polyethylene terephthalate, polybutylene terephthalate, polyethylene naphthalate, or the like, and polyolefin films made of polypropylene, polyethylene, or the like; synthetic papers, such as a polyolefin-based resin synthetic paper, a polystyrene-based resin synthetic paper, a polyvinyl chloride-based resin synthetic paper, and a polyester-based resin synthetic paper; and nonwoven fabrics. Of these, paper substrates and plastic films are preferred, and paper substrates and polyester films are more preferred.

In the case of using a paper substrate as the support, it is preferred that the wire side of the paper to be used is the surface on the side of the layer (X1) and the layer (Y1). Here, the "wire side" refers to the surface coming into contact with the papermaking wire side on the occasion of papermaking. In addition, the surface on the opposite side of the paper substrate to the "wire side" is also called "felt side".

One surface or both surfaces of the support may be subjected to a surface treatment, such as an oxidation method and an asperity formation method.

The oxidation method is not particularly limited, and examples thereof include a corona discharge treatment method, a plasma treatment method, a chromic acid oxidation method (wet type), a flame treatment method, a hot air treatment method, and an ultraviolet light-ozone treatment method.

The asperity formation method is not particularly limited, and examples thereof include a sand blast method and a solvent treatment method.

Although such a surface treatment is appropriately selected according to the kind of the substrate, from the viewpoint of improvement of adhesion between the support and the layer adjacent thereto as well as the viewpoint of operability, at least one selected from the corona discharge treatment method and the ultraviolet light-ozone treatment method is preferred. It is more preferred to perform both the corona discharge treatment method and the ultraviolet light-ozone treatment method.

A primer layer, a filler layer, or the like may be provided on one or both surfaces of the support as the need arises.

Examples of a component constituting the primary layer include a polyester-based resin, a urethane-based resin, a polyester urethane-based resin, and an acrylic resin. These resins may be used alone or in combination of two or more thereof.

The filler layer is provided for the purpose of further improving the adhesion between the substrate and the adhesion layer, or for the purpose of imparting rigidity in the case of a substrate that is too soft, such as a paper substrate. Although the filler layer is not particularly limited, examples thereof include layers made of, as a main component, a styrene-butadiene copolymer, an acrylic resin, a polyester-based resin, a polyurethane-based resin, a polystyrene-based resin, or the like, to which a filler, such as clay, silica, calcium carbonate, titanium oxide, and zinc oxide, is added as the need arises.

In the case of including such other layers, the thicknesses thereof are independently preferably 0.05 to 30 μm, more preferably 0.1 to 5 μm, still more preferably 0.1 to 1 μm, and yet still more preferably 0.1 to 0.5 μm.

The support that is used in the present invention may further contain an ultraviolet absorber, a photostabilizer, an antioxidant, an antistatic agent, a slipping agent, an anti-blocking agent, a colorant, or the like, if desired.

Although the thickness of the support is appropriately set according to an application of the substrate for release sheet, from the viewpoint of handling properties and economy, it is preferably 10 to 250 μm, more preferably 20 to 200 μm, and still more preferably 50 to 180 μm.

<Adhesion Layer (X1)>

In view of the fact that the substrate for release sheet of the present invention includes the adhesion layer (X1), it may be considered that the adhesion between the support and the resin layer (Y1) is improved, and on the occasion of forming convex portions on the surface of the resin layer (Y1) on the opposite side to the support, the effect for inhibiting the generation of the peeling trace is excellent.

The layer (X1) preferably contains at least one selected from polyethylene having a density of 900 kg/m³ or more and less than 930 kg/m³ (hereinafter also referred to simply as "L-PE") and a polar site-containing polyolefin.

(L-PE)

Examples of the L-PE include low density polyethylene, such as very low density polyethylene (VLDPE), high pressure-processed low density polyethylene (LDPE), and linear low density polyethylene (LLDPE).

The density of the L-PE is more preferably 900 to 925 kg/m³, and still more preferably 900 to 920 kg/m³.

The melt flow rate (MFR) of the L-PE as measured in conformity with JIS K6922-1 is preferably 1 to 20 g/10 min, and more preferably 3 to 15 g/10 min.

The melting point of the L-PE is preferably 90° C. or higher, and more preferably higher than 100° C.

As for the values of the density and the melting point, values measured by adopting the methods described in the section of Examples as mentioned later can be adopted.

The L-PE may be an ethylene homopolymer or may be a copolymer composed of ethylene as a main component monomer and made of ethylene and at least one selected from the group consisting of an α-olefin having 3 to 20 carbon atoms and a cyclic olefin so long as the aforementioned density is satisfied.

In this specification, the "main component monomer" refers to a monomer which forms a structural unit contained in a largest amount in 100 mol % of the whole amount of structural units derived from the respective monomers constituting the polymer.

In the case where the L-PE contains a structural unit derived from the α-olefin having 3 to 20 carbon atoms and/or the cyclic olefin, so long as the aforementioned density of the L-PE is satisfied, though the content thereof can be adjusted without particular limitations, it is preferably 0.1 mol % or more and preferably less than 15 mol %, more preferably less than 10 mol %, and still more preferably less than 5 mol % in 100 mol % of the whole amount of the structural units derived from the respective monomers constituting the L-PE.

Examples of the α-olefin having 3 to 20 carbon atoms include various α-olefins, such as propylene; various α-olefins having 4 carbon atoms, e.g., 1-butene; various α-olefins having 5 carbon atoms, e.g., 1-pentene; various α-olefins having 6 carbon atoms, e.g., 1-hexene; various α-olefins having 7 carbon atoms, e.g., 1-heptene; and various α-olefins having 8 carbon atoms, e.g., 1-octene.

The α-olefin having 3 to 20 carbon atoms is preferably an α-olefin having 3 to 10 carbon atoms, more preferably an α-olefin having 3 to 8 carbon atoms, and still more preferably an α-olefin having 3 to 6 carbon atoms.

In this specification, the aforementioned expression of "various α-olefins having R carbon atoms" includes all of isomers which may be considered as the α-olefin having R carbon atoms (R represents an integer). For example, so far as the expression of "various α-olefins having 4 carbon atoms" is concerned, various alkenes of "1-butene and isobutene" are expressed; and for example, so far as the expression of "various α-olefins having 6 carbon atoms" is concerned, various alkenes, such as "2,3-dimethyl-1-butene, 3,3-dimethyl-1-butene, 1-hexene, 2-methyl-1-p entene, 3-methyl-1-pentene, and 4-methyl-1-pentene" are expressed.

Examples of the cyclic olefin include norbornene, tetra-cyclododecene, dicyclopentadiene, ethylidene norbornene, and vinyl norbornene.

(Polar Site-Containing Polyolefin)

Examples of the polar site that the polar site-containing polyolefin contains include a carboxy group, a carboxylic acid anhydride-derived group, a carboxylic acid ester group, a hydroxy group, an epoxy group, an amide group, an ammonium group, a nitrile group, an amino group, an imide group, an isocyanate group, an acetyl group, a thiol group, an ether bond, an ester bond, a thioether bond, a sulfonyl group, a phosphoryl group, a nitro group, a urethane bond, and a halogen atom. Of these polar sites, a carboxy group, a carboxylic acid anhydride-derived group, a carboxylic acid ester group, a hydroxy group, an ammonium group, an amino group, an imide group, and an isocyanate group are preferred, with a carboxy group, a carboxylic acid anhydride-derived group, and a carboxylic acid ester group being more preferred.

Preferably, examples of the polar site-containing polyolefin include a copolymer of an olefin and a polar site-containing monomer; and a modified polyolefin.

As the copolymer of an olefin and a polar site-containing monomer, all of a random copolymer, a block copolymer, and a graft copolymer are usable.

Examples of the aforementioned olefin include at least one selected from the group consisting of ethylene and the aforementioned α-olefins having 3 to 20 carbon atoms. Of these, at least one selected from the group consisting of ethylene and α-olefins having 3 to 8 carbon atoms is preferred; and at least one selected from ethylene and propylene is more preferred; and ethylene is still more preferred.

The polar site-containing monomer is preferably a compound having at least one selected from the group consisting of the aforementioned various polar sites, and two or more kinds of polar sites may be included in a molecule thereof.

The polar site-containing monomer is preferably at least one selected from the group consisting of an unsaturated carboxylic acid, an unsaturated compound having a carboxylic acid anhydride group (for example, an anhydride of an unsaturated dicarboxylic acid), an unsaturated carboxylic acid ester (for example, an ester of an unsaturated carboxylic acid and an aliphatic alcohol), and a fatty acid vinyl; and more preferably at least one selected from the group consisting of methacrylic acid, acrylic acid, methyl methacrylate, methyl acrylate, maleic acid, maleic anhydride, and vinyl acetate.

In the copolymer of the olefin and the polar site-containing monomer, the content of the polar site-containing monomer-derived unit is preferably 0.1 to 30% by mass, and more preferably 0.2 to 10% by mass relative to 100% by mass of the total of the olefin-derived structural unit and the polar site-containing monomer-derived structural unit.

Preferably, examples of the copolymer of the olefin and the polar site-containing monomer include at least one selected from the group consisting of an ethylene-vinyl acetate copolymer (EVA), an ethylene-(meth)acrylic acid copolymer, and an ethylene-(meth)acrylic acid ester copolymer.

The modified polyolefin is preferably an acid-modified polyolefin.

Examples of the acid-modified polyolefin include ones obtained through modification (graft modification) by subjecting a polyolefin to a graft reaction with a modifier that is an unsaturated carboxylic acid and/or a derivative thereof in the presence of a radical initiator, such as an organic peroxide, to introduce a group derived from the unsaturated carboxylic acid and/or the derivative thereof into the polyolefin.

The graft reaction is performed by, for example, a method in which the polyolefin is blended with the modifier, the polyolefin is extruded in a molten state by using an extrusion molding machine or the like, and the polyolefin is modified at a high temperature under a high shear (melt kneading method); a method in which the polyolefin is dissolved in a solvent, and the solution is blended with the modifier to modify the polyolefin (solution method); or the like.

Examples of the polyolefin to be modified with the modifier include polymers obtained through polymerization of at least one monomer selected from the group consisting of ethylene, the aforementioned α-olefin having 3 to 20 carbon atoms, and the aforementioned cyclic olefin.

Of these, at least one selected from polymers composed of ethylene as a main component monomer (inclusive of an ethylene homopolymer), polymers composed of propylene as a main component monomer (inclusive of a propylene homopolymer), polymers composed of 1-butene as a main component monomer (inclusive of a 1-butene homopolymer), and polymers composed of 4-methyl-1-pentene as a main component monomer (inclusive of a 4-methyl-1-pentene homopolymer) is preferred; at least one selected from polymers composed of ethylene as a main component monomer and polymers composed of propylene as a main component monomer is more preferred; and at least one selected from polymers composed of propylene as a main component monomer is still more preferred.

In the case where other monomer is copolymerized together with the aforementioned main component monomer, the other monomer is preferably at least one selected from ethylene and an α-olefin having 3 to 10 carbon atoms.

Examples of the unsaturated carboxylic acid used as the modifier and/or the derivative thereof include an unsaturated compound having a carboxylic acid group (unsaturated carboxylic acid), an unsaturated compound having a carboxylic acid anhydride group (for example, an anhydride of an unsaturated dicarboxylic acid), and a derivative of an unsaturated carboxylic acid, such as an unsaturated carboxylic acid ester (for example, an ester of an unsaturated carboxylic acid and an aliphatic alcohol). Examples of the unsaturated group that such an unsaturated compound has include a vinyl group, a vinylene group, and an unsaturated cyclic hydrocarbon group.

Examples of the unsaturated carboxylic acid include unsaturated monocarboxylic acids, such as acrylic acid, methacrylic acid, and crotonic acid; unsaturated dicarboxylic acids, such as maleic acid, fumaric acid, tetrahydrophthalic acid, itaconic acid, citraconic acid, glutaconic acid, norbornene dicarboxylic acid, nadic acid, and endosis-bicyclo[2.2.1]hept-5-ene-2,3-dicarboxylic acid; and unsaturated tricarboxylic acids, such as aconitic acid.

Examples of the unsaturated carboxylic acid anhydride include anhydrides of the aforementioned respective unsaturated polyvalent carboxylic acids, such as maleic anhydride, citraconic anhydride, and nadic anhydride.

As mentioned above, as the derivative of the unsaturated carboxylic acid, in addition to esters, such as unsaturated carboxylic acid esters, forms, such as acid halides, imides, and esters, may be used, and examples thereof include malenyl chloride, malenyl imide, monomethyl maleate, and dimethyl maleate.

These unsaturated carboxylic acids and/or the derivatives thereof can be used alone or in combination of two or more thereof. Of these, at least one selected from maleic acid, nadic acid, maleic anhydride, and nadic anhydride is preferred, at least one selected from maleic acid and maleic anhydride is more preferred, and maleic anhydride is still more preferred.

The graft ratio of the unsaturated carboxylic acid and/or the derivative thereof grafted in the acid-modified polyolefin is preferably 0.1% by mass or more, and more preferably 0.2% by mass or more, and it is preferably 20% by mass or less, and more preferably 5% by mass or less.

Examples of the polar site included in the aforementioned polar site-containing polyolefin include polar sites derived from the aforementioned suitable compounds, respectively. A polar site derived from at least one selected from the group consisting of an unsaturated carboxylic acid, an unsaturated compound having an unsaturated carboxylic acid anhydride group (for example, an anhydride of an unsaturated dicarboxylic acid), an unsaturated carboxylic acid ester (for example, an ester of an unsaturated carboxylic acid and an aliphatic alcohol), and a fatty acid vinyl is preferred; a polar site derived from at least one selected from the group consisting of methacrylic acid, acrylic acid, methyl methacrylate, methyl acrylate, maleic acid, nadic acid, maleic anhydride, nadic anhydride, and vinyl acetate is more preferred; and a polar site derived from at least one selected from the group consisting of methacrylic acid, acrylic acid, methyl methacrylate, methyl acrylate, maleic acid, maleic anhydride, and vinyl acetate is still more preferred.

The layer (X1) may further contain other resin component than the aforementioned resin components within a range where the effects of the present invention are not impaired.

Examples of the other resin component include a polyolefin-based resin other than the L-PE, such as polyethylene other than that having a density of 900 kg/m$^3$ or more and less than 930 kg/m$^3$ and polypropylene; a polyester-based resin; an acrylic resin other than the aforementioned copolymers; and a vinyl-based resin other than the aforementioned copolymers.

In 100% by mass of the materials forming the layer (X1), the content of at least one selected from the L-PE and the polar site-containing polyolefin is preferably 60% by mass or more, more preferably 70% by mass or more, still more preferably 80% by mass or more, yet still more preferably 90% by mass or more, even yet still more preferably 95% by mass or more, and even still more preferably 98% by mass or more, and it is preferably 100% by mass or less. In addition, the foregoing content is even still more further preferably 100% by mass.

The thickness of the layer (X1) is preferably 1 μm or more, more preferably 3 μm or more, and still more preferably 5 μm or more, and it is preferably 50 μm or less, more preferably 30 μm or less, and still more preferably 20 μm or less.

The layer (X1) is preferably a layer not having convex portions of 0.5 μm or more on the surface thereof on the opposite side to the support.

<Resin Layer (Y1)>

The resin layer (Y1) is a layer containing polyethylene having a density of 930 kg/m$^3$ or more and 960 kg/m$^3$ or less (hereinafter also referred to simply as "H-PE") and having convex portions having a difference in height of 0.5 μm or more on the surface thereof on the opposite side to the support.

In view of the fact that the layer (Y1) contains the H-PE, it becomes easy to maintain the shape of the convex portion at the time of production and at the time of storage and transportation of the substrate for release sheet, the release sheet using the substrate for release sheet, and the pressure sensitive adhesive sheet using the release sheet, respectively. In consequence, such is also suitable in the case of use for an application in which more precise convex portions (convex portions having a low height and convex portions having a narrow width) are required.

Examples of the H-PE include medium density polyethylene (MDPE) and high density polyethylene (HDPE).

The H-PE may be an ethylene homopolymer or may be a copolymer of ethylene and at least one selected from the group consisting of α-olefins having 3 to 8 carbon atoms.

Examples of the α-olefin having 3 to 8 carbon atoms include olefins, such as propylene, 1-butene, isobutene, 1-pentene, 1-hexene, 4-methyl-1-pentene, 1-heptene, and 1-octene.

The density of the H-PE is preferably 930 to 950 kg/m$^3$, more preferably 930 to 945 kg/m$^3$, and still more preferably 930 to 940 kg/m$^3$.

The melt flow rate (MFR) of the H-PE as measured in conformity with JIS K6922-1 is preferably 1 to 20 g/10 min, and more preferably 3 to 15 g/10 min.

The melting point of the H-PE is preferably 105° C. or higher, and more preferably 110° C. or higher.

As for the values of the density and the melting point, values measured by adopting the methods described in the section of Examples as mentioned later can be adopted.

In 100% by mass of the materials forming the layer (Y1), the content of the H-PE is preferably 20% by mass or more, more preferably 30% by mass or more, still more preferably 60% by mass or more, yet still more preferably 70% by mass or more, even yet still more preferably 75% by mass or more, and even still more preferably 80% by mass or more, and it is preferably 100% by mass or less.

The layer (Y1) may further contain other resin component than the aforementioned H-PE within a range where the effects of the present invention are not impaired.

Examples of the other resin component include a polyolefin-based resin other than the H-PE, such as a polyolefin having a density of less than 900 kg/m$^3$, the aforementioned L-PE, and polypropylene; a polyester-based resin; the aforementioned copolymers; an acrylic resin other than the aforementioned copolymers; and a vinyl-based resin other than the aforementioned copolymers.

As the other resin component, at least one selected from the L-PE and a polyolefin having a density of less than 900 kg/m$^3$ is preferred, and a polyolefin having a density of less than 900 kg/m$^3$ is more preferred.

Examples of the polyolefin having a density of less than 900 kg/m$^3$ include copolymers of at least one selected from the group consisting of ethylene and the aforementioned α-olefins having 3 to 20 carbon atoms.

Of these, at least one selected from a copolymer composed of ethylene as a main component monomer, a copolymer composed of propylene as a main component monomer, and a copolymer composed of 1-butene as a main component monomer is preferred; and a copolymer composed of ethylene as a main component monomer is more preferred.

As other monomer that is copolymerized together with such a main component monomer, at least one selected from ethylene and an α-olefin having 3 to 20 carbon atoms is preferred; at least one selected from ethylene and an α-olefin having 3 to 10 carbon atoms is more preferred; and at least one selected from ethylene and an α-olefin having 3 to 8 carbon atoms is still more preferred.

The polyolefin having a density of less than 900 kg/m$^3$ is yet still more preferably a copolymer composed of ethylene as a main component monomer and made of ethylene and at least one selected from the group consisting of α-olefins having 3 to 8 carbon atoms; even yet still more preferably a copolymer composed of ethylene as a main component monomer and made of ethylene and at least one selected from the group consisting of α-olefins having 3 to 6 carbon atoms; and event still more preferably an ethylene-1-butene copolymer.

The melting point of the polyolefin having a density of less than 900 kg/m$^3$ is preferably 100° C. or lower, more preferably 80° C. or lower, and still more preferably 70° C. or lower.

In the case where the layer (Y1) contains the polyolefin having a density of less than 900 kg/m$^3$, in 100% by mass of the materials forming the layer (Y1), the content of the polyolefin having a density of less than 900 kg/m³ is preferably 5% by mass or more, more preferably 10% by mass or more, and still more preferably 15% by mass or more, and it is preferably 40% by mass or less, more preferably 30% by mass or less, and still more preferably 25% by mass or less.

In the case where the layer (Y1) contains the L-PE, in 100% by mass of the materials forming the layer (Y1), the content of the L-PE is preferably 10% by mass or more, more preferably 20% by mass or more, and still more preferably 35% by mass or more, and it is preferably 90% by mass or less, more preferably 80% by mass or less, and still more preferably 70% by mass or less.

(Other Additive)

The layer (Y1) may further contain other additive in addition to the aforementioned resin components within a range where the effects of the present invention are not impaired.

Examples of the other additive include a curing agent, an antioxidant, an ultraviolet absorber, a photostabilizer, a flame retardant, a conductive agent, an antistatic agent, a slipping agent, an antiblocking agent, a colorant, and a plasticizer.

In 100% by mass of the materials forming the layer (Y1), the content of each of these additives is preferably 0 to 20% by mass, more preferably 0 to 10% by mass, still more preferably 0 to 5% by mass, and yet still more preferably 0 to 2% by mass.

The thickness of the layer (Y1) is preferably 5 μm or more, and more preferably 10 μm or more, and it is preferably 50 μm or less, and more preferably 35 μm or less.

The "thickness of the layer (Y1)" refers to a thickness of from the surface of the layer (Y1) in a convex portion-free part on the opposite side to the support to the surface of the layer (X1) on the opposite side to the support.

Figure 3:
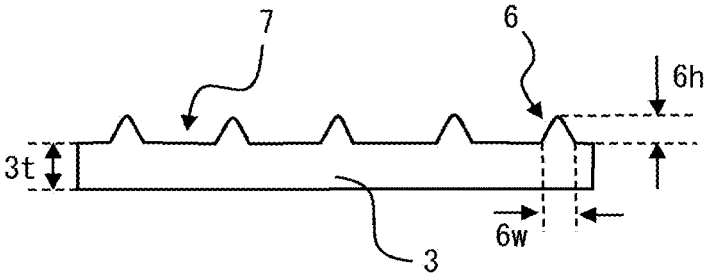
FIG. 3 is a cross-sectional schematic view illustrating an example of the constitution of the resin layer (Y1) included in the substrate for release sheet of the present invention, which is a cross-sectional schematic view of the resin layer (Y1) cut on a surface such that the convex portions present on the surface of the resin layer (Y1) can be discriminated.

For example, a distance $3t$ illustrated in FIG. 1 and FIG. 3 is corresponding to the thickness of the layer (Y1).

A value of a ratio [X1/Y1] of the thickness of the layer (X1) to the thickness of the layer (Y1) is preferably 0.02 or more, more preferably 0.10 or more, still more preferably 0.30 or more, yet still more preferably 0.50 or more, and even yet still more preferably 0.60 or more, and it is preferably 10.00 or less, more preferably 5.00 or less, still more preferably 3.00 or less, yet still more preferably 2.00 or less, and even yet still more preferably 1.00 or less.

(Convex Portion)

The difference in height of the convex portions is 0.5 μm or more, preferably 1.0 μm or more, more preferably 3.0 μm or more, and still more preferably 5.0 μm or more, and it is preferably 50.0 μm or less, more preferably 30.0 μm or less, still more preferably 18.0 μm or less, and yet still more preferably 14.0 μm or less.

The convex portion included in the resin layer (Y1) as prescribed in this specification refers to a raise portion having a difference in height of 0.5 μm or more. As for the convex portion, a part having a difference in height of 0.5 μm or more has only to be present in any part of the convex portions, and it is not necessary that the part has a difference in height of 0.5 μm or more over the entire region of the convex portions. Even in the case where a plurality of convex portions having a shape different from each other are present on the layer (Y1), similarly, a part having a difference in height of 0.5 μm or more has only to be present in any part of the convex portions, and it is not necessary that all the convex portions have a difference in height of 0.5 μm or more.

Although the width of the convex portion is not particularly limited, it is preferably 1.0 μm or more, more preferably 3.0 μm or more, and still more preferably 5.0 μm or more, and it is preferably 50.0 μm or less, more preferably 30.0 μm or less, and still more preferably 20.0 μm or less.

Figure 7:
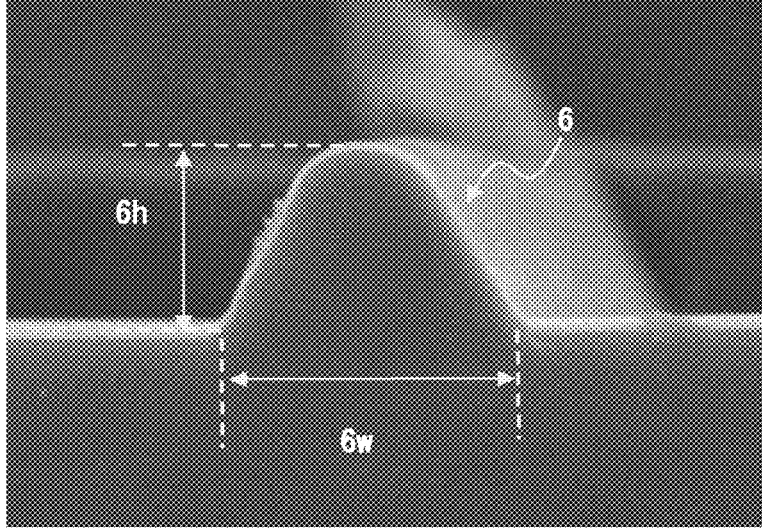
FIG. 7 is an image on the occasion of confirming the difference in height of the convex portions of the substrate for release sheet fabricated in Example 1 as an example of the present embodiment.

The difference in height and the width of the convex portion are values measured by adopting the methods described in the section of Examples. For example, a distance $6h$ illustrated in FIG. 3 is corresponding to the difference in height of the convex portion. In addition, a distance $6w$ illustrated in each of FIGS. 3 to 5 is corresponding to the width of the convex portion. As one example, when the explanation is made by reference to a cross-sectional image of the convex portion illustrated in FIG. 7, which is the image of a scanning electron microscope (SEM) taken using the method described in the section of Examples, a distance $6h$ in FIG. 7 is corresponding to the difference in height of the convex portion, and a distance $6w$ is corresponding to the width of the convex portion.

The shape of the convex portion in a plain view of the substrate for release sheet may be appropriately selected according to an application of the substrate for release sheet and may be either regular or irregular. However, in the case of use for the purpose of transferring the shape of the convex portion onto an adherend onto which the obtained release sheet is stuck, the shape of the convex portion is preferably regular.

In the case where the shape of the convex portion is regular in a plain view of the substrate for release sheet, examples of the shape include at least one shape selected from polygons, such as a triangle, a tetragon (inclusive of a rectangle, a square, and a trapezoid), a pentagon, and a hexagon; shapes in which a part or the whole of edges of the foregoing polygon are provided with a minute round (also called "provided with a rounded corner (R)"); circles, such as a true circle and an ellipse; semicircles, such as a half circle, a semi-ellipse, and a U-shape; shapes expressed by a closed region surrounded by at least three lines (inclusive of a straight line and a curved line); and shapes resulting from a combination thereof (the foregoing shape will be hereinafter also referred to as "independent convex portion shape").

As for the shape of the convex portion in a plain view of the substrate for release sheet, a convex portion continuously connecting from one side to another side of the surface of the substrate for release sheet may be formed (the foregoing shape will be hereinafter also referred to as "continuous convex portion shape"). Examples of the continuous convex portion shape include shapes in which the line connecting from one side to another side of the surface of the substrate for release sheet is straight, curved, zigzag, or wavy. When at least one selected from these continuous convex portion shapes is disposed with a predetermined space so as not to intersect each other or so as to intersect each other, convex portions in a stripe form illustrated in FIG. 4, in a lattice form illustrated in FIG. 5, or in another geometrical form can be provided on the layer (Y1). In this case, as in the lattice form illustrated in FIG. 5, concave portions 7 that are a region surrounded by the convex portions 6 may be formed. Examples of the shape of the concave portions 7 include the same shapes as the respective shapes described above regarding the independent convex portion shape.

On the layer (Y1), a discontinuous shape in which a part of the continuous convex portion shape lacks may be present, and the continuous convex portion shape and the independently convex portion shape may be intermingled.

The respective shapes which may be taken as the convex portions in a plain view of the substrate for release sheet may be regularly present or may be irregularly present. However, it is preferred that the convex portions are regularly present in a pattern form as illustrated in FIG. 4 or 5.

In the case of the lattice form as illustrated in FIG. 5, it can be considered that a single convex portion shape is formed because the same convex portion shapes (straight lines) intersect each other to form one convex portion, and no discontinuous part is present.

Although the cross-sectional shape of the convex portion on the occasion of cutting the layer (Y1) in the thickness direction cannot be unequivocally specified because it may vary depending upon the cutting surface, it may be a convex portion having a difference in height of 0.5 μm or more. Examples thereof include polygons, such as a triangle, a tetragon (inclusive of a rectangle, a square, and a trapezoid), a pentagon, and a hexagon; shapes in which a part or the whole of edges of the foregoing polygon are provided with a minute round (also called "provided with a rounded corner (R)"); and semicircles, such as a half circle, a semi-ellipse, and a U-shape.

In the case where a plurality of convex portions are present on the layer (Y1), the shapes of the plural convex portions may be the same as or different from each other, and in that case, the differences in height and the widths of the convex portions may be the same as or different from each other.

In the case where a plurality of convex portions are present, a foot distance between the convex portions is preferably 50 μm or more, more preferably 100 μm or more, still more preferably 150 μm or more, and yet still more preferably 200 μm or more, and it is preferably 2,000 μm or less, more preferably 1,500 μm or less, and still more preferably 1,000 μm or less.

Figure 8:
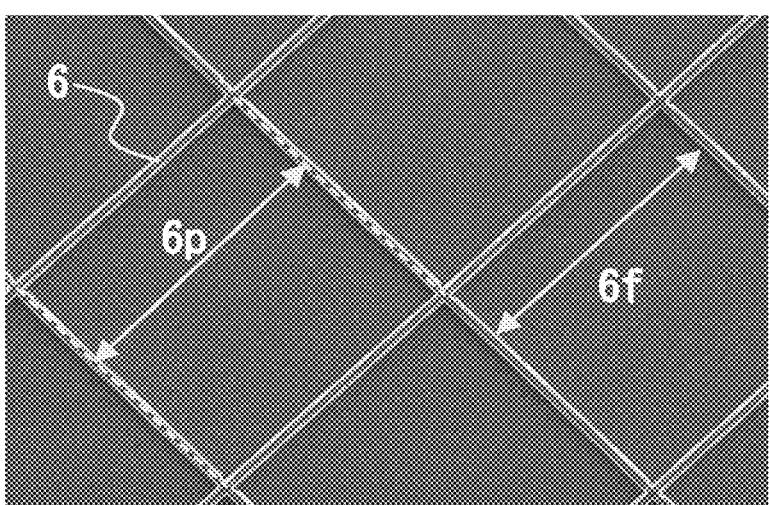
FIG. 8 is an image on the occasion of evaluating the presence or absence of generation of a peeling trace of the substrate for release sheet fabricated in Example 1 as an example of the present embodiment.

For example, in the case of FIG. 5, the foot distance of the convex portions expresses a shortest distance among distances between a foot of arbitrary one side of the concave portion forming a lattice and a foot of an opposing one side to the foregoing one side and refers to a distance 6f in FIG. 5 and FIG. 8.

In the case where a plurality of convex portions are present, a shortest pitch between the convex portions is preferably 50 μm or more, more preferably 100 μm or more, still more preferably 150 μm or more, and yet still more preferably 200 μm or more, and it is preferably 2,000 μm or less, more preferably 1,500 μm or less, and still more preferably 1,000 μm or less.

For example, in the case of FIG. 5, the shortest pitch of the convex portions expresses a shortest distance among distances of from an intermediate of a shortest distance between the feet of the convex portion forming one side of the lattice to an intermediate of a shortest distance between the feet of another convex portion forming an opposing one side to the foregoing one side and refers to a distance 6p in FIG. 5 and FIG. 8.

The convex portion shape can be, for example, formed by passing a laminate having a layer before it becomes the layer (Y1) on an outermost surface between an embossing roll and a backup roll to transfer a shape carved on the periphery of the embossing roll onto the surface of the layer before it becomes the layer (Y1).

For example, on a layer before it becomes the layer (Y1), the convex portions can also be formed using the same material as in the foregoing layer by utilizing a printing technique, such as a screen printing method.

For example, from the viewpoint of improving the adhesion between the surface of the layer (Y1), such as a release agent layer (Z) as mentioned later, on the opposite side to the support and a layer adjacent thereto, the surface of the layer (Y1) or the layer which becomes the layer (Y1) on the opposite side to the support may be subjected to a surface treatment, such as an oxidation method and an asperity formation method.

The oxidation method is not particularly limited, and examples thereof include a corona discharge treatment method, a plasma treatment method, a chromic acid oxidation method (wet type), a flame treatment method, a hot air treatment method, and an ultraviolet light-ozone treatment method.

The asperity formation method is not particularly limited, and examples thereof include a sand blast method and a solvent treatment method.

Although such a surface treatment is appropriately selected according to the kind of the layer (Y1) and the kind of the layer adjacent to the layer (Y1), from the viewpoint of improvement of adhesion between the layer (Y1) and the adjacent layer as well as the viewpoint of operability, the corona discharge treatment method is preferred.

<Resin Layer (Y2)>

As mentioned above, the substrate for release sheet preferably further includes a resin layer (Y2) (hereinafter also referred to simply as "layer (Y2)") on the opposite side to the resin layer (Y1) of the support.

Although materials forming the layer (Y2) can be appropriately selected according to an application of the substrate for release sheet, the same materials as those forming the layer (Y1) can be used, and a suitable mode thereof is also the same.

In 100% by mass of the materials forming the layer (Y2), the content of the H-PE is preferably 30% by mass or more, more preferably 50% by mass or more, still more preferably 60% by mass or more, yet still more preferably 70% by mass or more, even yet still more preferably 75% by mass or more, even still more preferably 80% by mass or more, even still more further preferably 90% by mass or more, even yet still more further preferably 95% by mass or more, and even yet still more further preferably 98% by mass or more, and it is preferably 100% by mass or less.

The thickness of the layer (Y2) is preferably 5 μm or more, and more preferably 10 μm or more, and it is preferably 50 μm or less, and more preferably 35 μm or less.

<Adhesion Layer (X2)>

As mentioned above, the substrate for release sheet may further include an adhesion layer (X2) as the need arises.

Although materials forming the layer (X2) can be appropriately selected according to an application of the substrate for release sheet, the same materials as those forming the layer (X1) can be used, and a suitable mode thereof is also the same. It is preferred that the same materials as the material forming the layer (X1) are used as the materials forming the layer (X2).

The thickness of the layer (X2) is preferably 1 μm or more, more preferably 3 μm or more, and still more preferably 5 μm or more, and it is preferably 50 μm or less, more preferably 30 μm or less, and still more preferably 20 μm or less.

In the case where the substrate for release sheet includes both the layer (Y2) and the layer (X2), a suitable range of a ratio [X2/Y2] of the thickness of the layer (X2) to the thickness of the layer (Y2) is the same as the suitable range of the value at which the value of the aforementioned ratio [X1/Y1] may be taken. Similar to the aforementioned ratio [X1/Y1], it should be construed that all the values of the thicknesses of the layer (X2) and the layer (Y2) on the occasion of calculating the ratio [X2/Y2] are those as expressed in terms of μm.

In the case where the substrate for release sheet includes the layer (Y2), or in the case where the substrate for release sheet includes both the layer (Y2) and the layer (X2), from the viewpoint that the generation of a curl of the substrate for release sheet can be inhibited, an absolute value of a difference between a total thickness (Y1$t$+X1$t$) of the layer (Y1) and the layer (X1) and a total thickness (Y2$t$+X2$t$) of the layer (Y2) and the layer (X2) is preferably 50 μm or less, more preferably 30 μm or less, and still more preferably 10 μm or less.

In the case where the substrate for release sheet includes the layer (Y2) or both the layer (Y2) and the layer (X2), from the same viewpoint, it is yet still more preferred that the total thickness (Y1$t$+X1$t$) and the total thickness (Y2$t$+X2$t$) are identical with each other.

In the case of a mode in which the substrate for release sheet includes the layer (Y2) but does not include the layer (X2), the aforementioned total thickness (Y2$t$+X2$t$) can be expressed as the thickness (Y2$t$) of the layer (Y2).

The entire thickness of the substrate for release sheet (a total of the thicknesses of the respective layers) is preferably 50 μm or more, more preferably 100 μm or more, and still more preferably 150 μm or more, and it is preferably 500 lam or less, more preferably 350 μm or less, and still more preferably 250 μm or less.

[Release Sheet]

The release sheet of the present invention further includes a release agent layer (Z) (hereinafter also referred to simply as "layer (Z)") on the resin layer (Y1) of the substrate for release sheet on the opposite side to the support.

One example of the release sheet according to the embodiment of the present invention is described by reference to FIG. 6, but it should be construed that the release sheet of the present invention is not limited to the following example.

Figure 6:
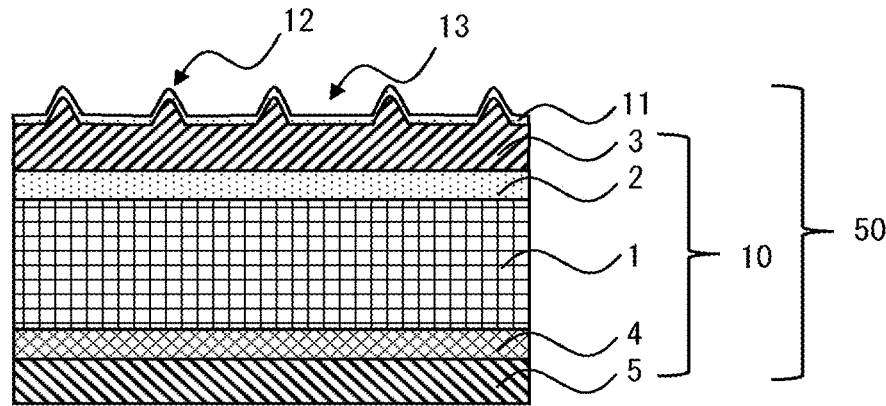
FIG. 6 is a schematic cross-sectional view illustrating an example of the constitution of the release sheet of the present invention, which is a cross-sectional schematic view of the release sheet cut on a surface such that the convex portions present on the surface of the release agent layer (Z) can be discriminated.

FIG. 6 is a schematic cross-sectional view of a release sheet 50, illustrating an example of the constitution of the release sheet of the present invention, which is a cross-sectional schematic view of the release sheet cut on a surface such that the resin layer (Y1) 3 and convex portions 12 present on the surface of a release agent layer (Z) 11 can be discriminated.

The constitution of the release sheet illustrated in FIG. 6 is a mode in which the release agent layer (Z) 11 is included on the resin layer (Y1) 3 of the substrate 10 for release sheet illustrated in FIG. 1 on the opposite side to the support 1.

In the constitution of the substrate for release sheet of the present invention, it is preferred that the rein layer (Y1) 3 and the release agent layer (Z) 11 are directly laminated in this order.

A suitable mode of the substrate for release sheet of the present invention that the release sheet of the present invention includes is the same as the aforementioned mode, and therefore, its explanation is omitted.

The layer (Z) is provided at least on the layer (Y1) on the opposite side to the support. In addition, though the release agent layer may be formed directly on the aforementioned surface of the layer (Y1) and provided, it may be provided via another layer, such as a primer layer, as the need arises.

<Release Agent Layer (Z)>

The release agent layer (Z) is a layer formed of a release agent. Examples of a releasable component that is contained in the release agent include a silicone-based resin; an olefin-based resin; rubber-based elastomers, such as an isoprene-based resin and a butadiene-based resin; long-chain alkyl-based resins; long-chain alkyl acrylate-based resins; alkyd-based resins; and fluorine-based resins. Of these, a silicone-based resin is preferred.

The thickness of the layer (Z) is not particularly limited so long as it is a thickness at which the convex portions included in the layer (Y1) do not vanish. In order to form the layer (Z) on the layer (Y1) having the convex portions, the thickness of the layer (Z) is preferably 0.05 g/m$^2$ or more, and more preferably 0.1 g/m$^2$ or more, and it is preferably 2.0 g/m$^2$ or less, and more preferably 1.0 g/m$^2$ or less in terms of a basis weight.

The convex portions are present on the surface of the layer (Z). The convex portion present on the surface of the layer (Z) is one reflecting the convex portions included in the layer (Y).

Therefore, the difference in height of the convex portions included in the layer (Z) is preferably 0.4 μm or more, more preferably 0.5 μm or more, still more preferably 1.0 μm or more, yet still more preferably 3.0 μm or more, and even yet still more preferably 5.0 μm or more, and it is preferably 50.0 μm or less, more preferably 30.0 μm or less, still more preferably 18.0 μm or less, and yet still more preferably 14.0 μm or less.

The convex portions included in the release agent layer (Z) as prescribed in this specification are different from the convex portions included in the aforementioned resin layer (Y1) and do not always refer to a protrusion having a difference in height of 0.5 μm or more. With respect to a suitable range of the convex portions included in the layer (Z), for example, in the case where the foregoing difference in height is preferably 0.4 μm or more, a part having a difference in height of 0.4 μm has only to be present in any part of the convex portions, and it is not necessary that the part has a difference in height of 0.4 μm or more over the entire region of the convex portions. Even in the case where a plurality of convex portions having a shape different from each other are present on the layer (Z), similarly, a part having a difference in height of 0.4 μm or more has only to be present in any part of the convex portions, and it is not necessary that all the convex portions have a difference in height of 0.4 μm or more.

Although the width of the convex portion is not particularly limited, it is preferably 1.0 μm or more, more preferably 3.0 μm or more, and still more preferably 5.0 μm or more, and it is preferably 50.0 μm or less, more preferably 30.0 μm or less, and still more preferably 20.0 μm or less.

[Production Method of Substrate for Release Sheet]

A production method of the substrate for release sheet includes at least a step (2) of forming a layer serving as the resin layer (Y1) and containing polyethylene having a density of 930 kg/m$^3$ or more and 960 kg/m$^3$ or less, and preferably more than 930 kg/m$^3$ and 960 kg/m$^3$ or less by a melt extrusion method and pressing the layer serving as the resin layer (Y1) onto the surface of an embossing roll to form a convex portion having a difference in height of 0.5 μm or more on the surface of the layer serving as the resin layer (Y1), thereby forming the resin layer (Y1).

In the following description, modes of the support, the adhesion layer (X1), the resin layer (Y1), the adhesion layer (X2), and the resin layer (Y2) and a mode of the obtained substrate for release sheet are the same as the modes described above in the section of the substrate for release sheet, and suitable modes thereof are also the same, and therefore, detailed explanations thereof are omitted.

<Step (2)>

As the step (2), the following step (2A) or (2B) is preferably exemplified, and from the viewpoint that the number of steps can be simplified, the step (2A) is more preferred.

Step (2A):

A step in which a layer serving as the adhesion layer (X1) and a layer serving as the resin layer (Y1) containing a polyethylene having a density of 930 kg/m³ or more and 960 kg/m³ or less, and preferably more than 930 kg/m³ and 960 kg/m³ or less are simultaneously formed on at least one surface side of the support by a melt extrusion method such that the adhesion layer (X1) is disposed on the support side; and subsequently, the layer serving as the resin (Y1) is pressed onto the surface of an embossing roll to form convex portions having a difference in height of 0.5 μm or more on the surface of the layer serving as the resin layer (Y1), thereby forming the adhesion layer (X1) and the resin layer (Y1).

Step (2B):

A step in which on the opposite side of the adhesion layer (X1) of a laminate (L1) containing the support and the adhesion layer (X1) to the support, a layer serving as the resin layer (Y1) containing a polyethylene having a density of 930 kg/m³ or more and 960 kg/m³ or less, and preferably more than 930 kg/m³ and 960 kg/m³ or less is formed by a melt extrusion method; and subsequently, the layer serving as the resin (Y1) is pressed onto the surface of an embossing roll to form convex portions having a difference in height of 0.5 μm or more on the surface of the layer serving as the resin layer (Y1), thereby forming the resin layer (Y1).

(Step 2A)

In the case of the step (2A), as mentioned above, the layer serving as the layer (X1) and the layer serving as the layer (Y1) are simultaneously laminated on at least one surface side of the support in the order from the support side by a melt extrusion method. More specifically, the materials forming the layer (X1) and the materials forming the layer (Y1) are melted, respectively within different melt kneading machines, such as extruders; then, the respective materials are coextruded from a die capable of undergoing simultaneous extrusion; and the layer serving as the layer (X1) and the layer serving as the layer (Y1) are simultaneously laminated in this order on the surface of the support from the support side (hereinafter also referred to as "simultaneous lamination method").

As the die to be used for the simultaneous lamination method, a T-die for coextrusion molding is preferably used.

In the step (2A), though the temperature of the die on the occasion of simultaneously extruding the molten materials forming the layer (X1) and the molten materials forming the layer (Y1) can be appropriately set according to the kinds of the used materials, it is preferably 290° C. or higher, more preferably 300° C. or higher, and still more preferably 310° C. or higher, and it is preferably 360° C. or lower, more preferably 350° C. or lower, and still more preferably 340° C. or lower.

It is preferred that after melt extruding the materials forming the layer (X1) and the materials forming the layer (Y1), and before the layer serving as the layer (Y1) is solidified, the surface of the layer serving as the layer (Y1) is pressed onto the surface of an embossing roll, to form the layer (Y1) having convex portions. Therefore, it is more preferred that the embossing roll functions to form the convex portions and also has a role as a cooling roll.

The temperature of the embossing roll onto which the layer serving as the layer (Y1) is pressed is preferably 50° C. or lower, more preferably 40° C. or lower, and still more preferably 30° C. or lower, and it is preferably 5° C. or higher, more preferably 10° C. or higher, and still more preferably 15° C. or higher.

As the embossing roll, an embossing roll which has been previously designed so as to form the aforementioned convex portions is used. That is, when the embossing roll is crimped on the surface of the layer serving as the layer (Y1), an embossed pattern of the surface of the embossing roll is transferred onto the surface of the layer serving as the layer (Y1), whereby the layer (Y1) having convex portions is formed.

As mentioned above, a mode of the formed convex portions is the same as that described above in the section of the substrate for release sheet, and a suitable mode thereof is also the same, and therefore, detailed explanations thereof are omitted. (Step 2B)

In the step (2B), after fabricating the laminate (L1) containing the support and the layer (X1) in advance, the layer (Y1) is formed on the layer (X1) in the laminate (L1) on the opposite side to the support by adopting the aforementioned method.

Although the fabrication method of the laminate (L1) is not particularly limited, it is preferred to form the materials forming the layer (X1) on at least one surface side of the support by the melt extrusion method.

In consequence, in the case of the step (2B), the layer serving as the layer (X1) and the layer serving as the layer (Y1) are sequentially laminated on at least one surface side of the support in the order from the support side by a melt extrusion method (hereinafter also referred to as "sequential lamination method").

On the occasion of forming the layer serving as the layer (X1) in the step (2B), the materials forming the layer (X1) are melted within a melt kneading machine, such as an extruder, and then extruded from a die, thereby forming the layer (X1) on the support or the surface of the laminate in which the support and the other layer are laminated.

On the occasion of forming the layer serving as the layer (Y1) in the step (2B), the materials forming the layer (Y1) are melted within a melt kneading machine, such as an extruder, and then extruded from a die, thereby forming the layer (Y1) on the surface of the layer (X1) on the opposite side to the support or the surface of the other layer laminated on the layer (X1) on the opposite side to the support.

As the die in the case of use for the sequential lamination method, though a T-die for coextrusion molding or single-layer extrusion molding may be used for every layer according to the number of layers to be laminated, it is preferred to use a T-die for single-layer extrusion molding for the formation of at least the layer (Y1), and it is more preferred to use a T-die for single-layer extrusion molding for the formation of all of the layer (X1) and the layer (Y1).

Although the temperature of each of the dies on the occasion of melting and extruding the materials forming the layer (X1) and the materials forming the layer (Y1) may be independently appropriately set according to the kinds of the used materials in the step (2B), it is preferably 290° C. or higher, more preferably 300° C. or higher, and still more preferably 310° C. or higher, and it is preferably 360° C. or lower, more preferably 350° C. or lower, and still more preferably 340° C. or lower.

A mode, a use condition, and so on of the embossing roll are the same as those described regarding the step (2A), and suitable modes thereof are also the same, and therefore, detailed explanations thereof are omitted.

On the occasion of forming the layer (X1) by the sequential lamination method, different from the embossing roll on the occasion of forming the layer (Y1), it is preferred to use a usual cooling roll that is used for film molding or the like.

<Step 1>

The production method of the substrate for release sheet preferably further includes a step (1) of forming the resin layer (Y2) on the support on the opposite side to the side on which the resin layer (Y1) is formed.

Although the method for forming the layer (Y2) on the support is not particularly limited, it is preferred to form the materials forming the layer (Y2) on the surface side of the support on the opposite side to the side on which the layer (Y1) is formed by the melt extrusion method.

In the step (1), the adhesion layer (X2) may be further formed as the need arises, and in that case, the following step (1A) or (1B) is preferably exemplified. In the case of forming the layer (X2) in the step (1), from the viewpoint that the number of steps can be simplified, the step (1A) is more preferred.

Step (1A):

A step in which a layer serving as the adhesion layer (X2) and a layer serving as the resin layer (Y2) are simultaneously formed on at least one surface side of the support by the melt extrusion method such that the adhesion layer (X2) is disposed on the support side.

Step (1B):

A step in which the layer serving as the resin layer (Y2) is formed on the adhesion layer (X2) of a laminate (L2) containing the support and the adhesion layer (X2) on the opposite side to the support by the melt extrusion method.

The methods of forming the layer (X2) and the layer (Y2) by the step (1A) and the step (1B) are the same as the methods described above in the step (2A) and the step (2B), respectively, except for forming the convex portions using an embossing roll, and suitable modes thereof are also the same, and therefore, detailed explanations thereof are omitted.

On the occasion of forming the layer (Y2), different from the embossing roll to be used in the step (2), a usual cooling roll that is used for film molding or the like is used in the step (1). The surface of the cooling roll can be changed to a matte-tone processed surface or the like according to an application of the obtained substrate for release sheet or release sheet so long as it does not affect the effects of the present invention.

From the viewpoint of inhibiting any change of the convex portion shape included in the layer (Y1), which is caused due to heat, it is preferred to perform the step (1) prior to the step (2).

In the case of performing the step (1) prior to the step (2), the wording "at least one surface side of the support" in the explanation of the step (2) as mentioned above refers to the surface side of the support on the opposite side to the side on which the layer (Y2) and the optionally formed layer (X2) are formed.

In the case of performing the step (1) prior to the step (2), the wording "opposite side of the adhesion layer (X1) of a laminate (L1) containing the support and the adhesion layer (X1) to the support" in the explanation of the step (2B) as mentioned above refers to the surface side of the layer (X1) on the opposite side to the side on which the layer (Y2) and the optionally formed layer (X2) are formed.

[Production Method of Release Sheet]

The production method of the release sheet includes a step of forming a release layer (Z) on the side on which the convex portions of the resin layer (Y1) of the substrate for release sheet are present.

As a method of forming the release layer (Z), there is exemplified a method in which the release agent is coated on the side on which the convex portions of the resin layer (Y1) of the substrate for release sheet are present and then dried to form the release agent layer.

In the following description, modes of the substrate for release sheet and the release agent layer (Z) and a mode of the obtained release sheet are the same as the modes described above in the section of the substrate for release sheet and release sheet, and suitable modes thereof are also the same, and therefore, detailed explanations thereof are omitted.

In the case of coating the release agent, for example, it may be dissolved in an organic solvent to form a solution and then coated by a known coating method.

Examples of the organic solvent include methanol, ethanol, propanol, butanol, isopropyl alcohol, methyl ethyl ketone, methyl isobutyl ketone, cyclohexanone, ethyl acetate, butyl acetate, toluene, n-heptane, and mineral spirit.

The coating method is not particularly limited, and examples thereof include a spin coating method, a spray coating method, a bar coating method, a knife coating method, a roll knife coating method, a roll coating method, a blade coating method, a dip coating method, a curtain coating method, a the coating method, and a gravure coating method.

After coating the solution containing the release agent to form a coating film, the drying temperature and the drying time of the coating film are not particularly limited but can be appropriately set. However, from the viewpoint of preventing deformation of the convex portions of the layer (Y1) to be caused due to heat or generation of an appearance failure or the like on the surface of the layer (Y1) to be caused due to heat, the drying temperature of the coating film is preferably 10 to 140° C., more preferably 50 to 130° C., and still more preferably 80 to 120° C.

[Application of Substrate for Release Sheet and Release Sheet]

As for the substrate for release sheet, when the convex portions are formed on the substrate for release sheet, a peeling trace is not generated, and the appearance of the surface of the resin layer (Y1) with convex portions is favorable. Therefore, when a release sheet is produced using the substrate for release sheet, the generation of a peeling trace on the release agent layer to be caused due to the peeling trace of the substrate for release sheet can be inhibited and prevented from occurring. The release sheet obtained using the substrate for release sheet is, for example, suitable as a release sheet to be used for an application in which it is not desired to affect an appearance of the transfer surface of an adherend onto which the shape formed by the convex portions included in the release agent layer (Z) is transferred and other characteristics of the adherend given by the appearance. For example, a pressure sensitive adhesive sheet having a concave-convex surface, which is formed using the release sheet, is excellent in appearance of the transfer surface. In addition, for example, in the case where the appearance failure of the transfer surface affects the surface on the opposite side to the transfer surface, the foregoing release sheet is also suitable, for example, as a release sheet used for production and protection of a pressure sensitive adhesive sheet to be used for an application in which an excellent appearance is also required for the surface of the pressure sensitive adhesive sheet on the opposite side to the pressure sensitive adhesive layer.

Furthermore, in the case of using a release sheet having a continuous convex portion shape as mentioned above, the release sheet can be suitably used for a pressure sensitive adhesive sheet required so as to have air escape properties and its production.

Therefore, the pressure sensitive adhesive sheet which is produced using the release sheet as one embodiment of the present invention can be suitably used for applications requiring air escape properties or an appearance, for example, discrimination use, decoration use, paint masking use, and surface protection use of metal plates or the like. More specifically, the pressure sensitive adhesive sheet can be suitably used for painting-alternate tapes, marking films, and vehicle attachment tapes (for example, decorative tapes or blackout tapes for decorating the exterior or interior of an automobile).

In consequence, for the aforementioned reasons, the release sheet can be suitably used as a release sheet for pressure sensitive sheet to be used for the aforementioned various applications and a release sheet on the occasion of producing the pressure sensitive adhesive sheet.

Similarly, for the aforementioned reasons, the aforementioned substrate for release sheet can be suitably used as the substrate for release sheet to be used for release sheets to be used for the aforementioned various applications.

EXAMPLES

The present invention is described more specifically with reference to the following Examples, but it should be construed that the present invention is not limited to the following Examples. The physical property values in the following Examples are values measured by the following methods.

<Density of Raw Material Resin>

The density of the raw material resin was measured in conformity with the A method (underwater substitution method) of JIS K7112:1999.

<Melting Point>

The melting point was measured with a differential scanning calorimeter (DSC) (manufactured by TA Instruments, product name: "Q2000") in conformity with JIS K7121.

<Thickness of Support>

The thickness of the support was measured with a constant-pressure thickness measuring instrument, (manufactured by TECLOCK Co., Ltd., model number: "PG-02J", standard specification: in conformity with JIS K6783-1994, JIS Z1702-1994, and JIS Z1709-1995).

<Thickness of Each Layer in Substrate for Release Sheet>

As for the resin layer (Y1) of the substrate for release sheet fabricated in each of the Examples and Comparative Examples, a cross section thereof in the thickness direction cut in the vertical direction against the surface parallel to the surface of the resin layer (Y2) (corresponding to a part in which concave portions were formed upon embossing) was observed with a scanning electron microscope (manufactured by Hitachi, Ltd., product name: "S-4700"), to measure the thickness of each of the adhesion layer (X1), the resin layer (Y1), the adhesion layer (X2), and the resin layer (Y2).

<Difference in Height and Width of Convex Portions>

As for the difference in height and width of the convex portions present on the surface of the substrate for release sheet fabricated in each of the Examples and Comparative Examples on the opposite side to the support of the resin layer (Y2), the cross section of the substrate for release sheet was observed with a scanning electron microscope (manufactured by Hitachi, Ltd., product name: "S-4700"), and the measurement was performed utilizing measurement functions of an image analysis software for scanning electron microscope.

<Confirmation of Presence or Absence of Generation of Peeling Trace>

The generation of a peeling trace on the surface of the resin layer (Y1) of the substrate for release sheet fabricated in each of the Examples and Comparative Examples, on which the convex portions were present, was confirmed with a scanning electron microscope (manufactured by Hitachi, Ltd., product name: "S-4700").

The presence or absence of a peeling trace on the surface of the release agent layer (Z) of each of the release sheets fabricated by adopting the production method as mentioned later, on which the convex portions were present, was confirmed by the same method.

The presence or absence of the generation of the peeling trace was evaluated according to the following criteria.

(Evaluation Criteria of Presence or Absence of Generation of Peeling Trace)

A: The peeling trace was not generated on the surface of the layer as the observation object (the layer (Y1) or the layer (Z)).

F: The peeling trace was generated on the surface of the layer as the observation object (the layer (Y1) or the layer (Z)).

[Production of Substrate for Release Sheet]

Example 1

On the felt side of a wood-free paper 1 as the support, low density polyethylene (product name: "NOVATEC (registered trademark) LC605Y", manufactured by Japan Polyethylene Corporation; hereinafter also referred to as "LDPE") as a material of the adhesion layer (X2) and medium density polyethylene (product name: "SUMI-KATHENE (registered trademark) L5721", manufactured by Sumitomo Chemical Co., Ltd.; hereinafter also referred to as "MDPE") as a material of the resin layer (Y2) were subjected to melt coextrusion with a two-layer T-die at a die temperature of 330° C. such that the layer (X2) side was disposed on the support surface side, thereby obtaining a laminate.

On the wire side as an exposed surface of the support of the obtained laminate, LDPE as a material of the adhesion layer (X1) and MDPE as a material of the resin layer (Y1) were subjected to melt coextrusion with an extruder provided with a two-layer T-die at a preset die temperature of 330° C. such that the layer (X1) side was disposed on the support surface side, and then pressed onto an embossing roll set at 23° C., thereby obtaining a substrate for release sheet having respective layers shown in Table 1.

Examples 2 to 6

Substrates for release sheet having respective layers shown in Table 1 were obtained in the same manner as in Example 1, except that the support and materials shown in Table 1 were used as the support, the material of the resin layer (Y1), and the material of the adhesion layer (X1), respectively.

Comparative Example 1

A substrate for release sheet having respective layers shown in Table 1 was obtained in the same manner as in Example 1, except that the adhesion layer (X1) was not provided.

The thickness of each of the layers included in the substrate for release sheet fabricated in each of the Examples and Comparative Examples and the difference in height and width of the convex portions included in the resin layer (Y1) were measured by the aforementioned methods. In addition, with respect to each of the substrates for release sheet, the presence or absence of a peeling trace on the surface of the resin layer (Y1) was evaluated by the aforementioned method. The results are shown in Table 1.

[Production of Release Sheet]

(Preparation of Release Agent Composition)

As a release agent composition, 1 part by mass of a platinum catalyst (manufactured by Shin-Etsu Chemical Co., Ltd., product name: "PL-50T", solid content: 2% by mass) was added to 100 parts by mass of a releasable silicone compound (manufactured by Shin-Etsu Chemical Co., Ltd., product name: "SILICONE KS-847", solid content: 30% by mass), and the contents were diluted with toluene and mixed, to prepare a solution of a silicone-based release agent composition (solid content: 2% by mass).

(Fabrication of Release Sheet)

Using each of the substrates for release sheet obtained in Examples 1 to 6 and Comparative Example 1, a release sheet was produced in the following manner.

Each of the substrates for release sheet obtained in Examples 1 to 6 and Comparative Example 1 was used as the substrate. On each of the substrates for release sheet, the solution of the above-prepared release agent composition was coated with a Meyer bar, to form a coating film. Subsequently, the coating film was dried at 110° C. for 3 minutes, to fabricate a release sheet having the release agent layer (Z) in a coating amount of 0.6 g/m$^2$.

With respect to each of the obtained release sheets, the presence or absence of a peeling trace on the surface of the release agent layer (Z) was evaluated by the aforementioned method. The results are shown in Table 1.

TABLE 1

| | Substrate for release sheet | | | | | | |
|---|---|---|---|---|---|---|---|
| | Resin layer (Y1) | | | | Adhesion layer (X1) | | Support |
| | Material | Thickness [μm] | Difference in height of convex portions [μm] | Width of convex portions [μm] | Material | Thickness [μm] | Material |
| Example 1 | MDPE | 18 | 10 | 15 | LDPE | 12 | Wood-free paper 1 |
| Example 2 | MDPE | 18 | 10 | 15 | LDPE | 12 | Wood-free paper 2 |
| Example 3 | MDPE | 18 | 10 | 15 | LDPE | 12 | PET |
| Example 4 | Resin composition 1 | 18 | 10 | 15 | LDPE | 12 | Wood-free paper 1 |
| Example 5 | Resin composition 2 | 18 | 10 | 15 | LDPE | 12 | Wood-free paper 1 |
| Example 6 | MDPE | 18 | 10 | 15 | Polar site-containing polyolefin | 12 | Wood-free paper 1 |
| Comparative Example 1 | MDPE | 18 | 10 | 15 | — | — | Wood-free paper 1 |

| | Substrate for release sheet | | | | | | Evaluation |
|---|---|---|---|---|---|---|---|
| | Support | Adhesion material (X2) | | Resin layer (Y2) | | Evaluation of peeling trace | of peeling trace of |
| | Thickness [μm] | Material | Thickness [μm] | Material | Thickness [μm] | peeling trace | release sheet |
| Example 1 | 125 | LDPE | 12 | MDPE | 18 | A | A |
| Example 2 | 155 | LDPE | 12 | MDPE | 18 | A | A |
| Example 3 | 100 | LDPE | 12 | MDPE | 18 | A | A |
| Example 4 | 125 | LDPE | 12 | MDPE | 18 | A | A |
| Example 5 | 125 | LDPE | 12 | MDPE | 18 | A | A |
| Example 6 | 125 | Polar site-containing polyolefin | 12 | MDPE | 18 | A | A |
| Comparative Example 1 | 125 | LDPE | 12 | MDPE | 18 | F | F |

Respective abbreviations shown in Table 1 express the following materials and resins.

Wood-free paper 1:
    Basis weight: 115.0 g/m$^2$, thickness: 125 μm
Wood-free paper 2:
    Basis weight: 116.3 g/m$^2$, thickness: 155 μm
PET:
    Product name: "DIAFOIL (registered trademark) T-100", manufactured by Mitsubishi Chemical Corporation, thickness: 100 μm
MDPE:
    Product name: "SUMIKATHENE (registered trademark) L5721", manufactured by Sumitomo Chemical Co., Ltd., density: 937 kg/m$^3$, melting point: 114° C.
LDPE:
    Product name: "NOVATEC (registered trademark) LC605Y", manufactured by Japan Polyethylene Corporation, density: 918 kg/m$^3$, melting point: 103° C.
Resin composition 1:
    Resin composition consisting of 30% by mass of MDPE (product name: "SUMIKATHENE L5721") and 70% by mass of low density polyethylene (product name: "SUMIKATHENE L705", manufactured by Sumitomo Chemical Co., Ltd., density: 919 kg/m$^3$, melting point: 106° C.)
Resin composition 2:
    Resin composition consisting of 80% by mass of MDPE (product name: "SUMIKATHENE (registered trademark) L5721") and 20% by mass of an ethylene/1-butene copolymer (product name: "TAFMER (registered trademark) A4085S, manufactured by Mitsui Chemicals, Inc., density: 885 kg/m$^3$, melting point 66° C.)
Polar site-containing polyolefin:
    Product name: "ADMER (registered trademark) SF741", manufactured by Mitsui Chemicals, Inc.

From Table 1, it was confirmed that in the substrates for release sheets of Examples 1 to 6, for example, as shown in FIG. 8 regarding the SEM photograph of the surface of the resin layer (Y1) of the substrate for release sheet of Example 1, the peeling trace was not generated on the surface of the resin layer (Y1). It may be considered that each of these substrates for release sheet included the adhesion layer (X1), and therefore, on the occasion of forming the convex portions, the occurrence of partial peeling between the layers of the support and the resin layer (Y1) could be inhibited, and the generation of a peeling trace could be prevented from occurring.

Figure 9:
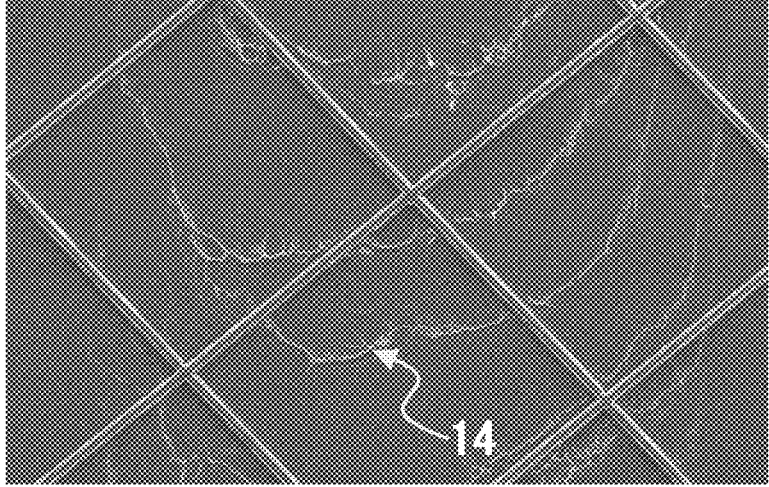
FIG. 9 is an image on the occasion of evaluating the presence or absence of generation of a peeling trace of the substrate for release sheet fabricated in Comparative Example 1 as an example of the present embodiment.

On the other hand, it was confirmed that in the substrate for release sheet of Comparative Example 1, as shown in FIG. 9 regarding the SEM photograph of the surface of the resin layer (Y1) of the substrate for release sheet of Comparative Example 1, the peeling trace was generated on the surface of the resin layer (Y1). It may be considered that since this substrate for release sheet did not have the adhesion layer (X1), on the occasion of forming the convex portions, the occurrence of partial peeling between the layers of the support and the resin layer (Y1) was caused.

In addition, it was confirmed that in the release sheet fabricated using the substrate for release sheet of each of Examples 1 to 6, the peeling trace was not generated on the surface of the release agent layer (Z). In addition, it was confirmed that in the release sheet fabricated using the substrate for release sheet of Comparative Example 1, the peeling trace was generated on the surface of the release agent layer (Z).

INDUSTRIAL APPLICABILITY

As for the substrate for release sheet as one embodiment of the present invention, when the convex portions are formed on the substrate for release sheet, a peeling trace is not generated, and the appearance of the surface of the resin layer with convex portions is favorable. Therefore, when a release sheet is produced using the foregoing substrate for release sheet, the generation of a peeling trace on the release agent layer to be caused due to the peeling trace of the substrate for release sheet can be inhibited and prevented from occurring. The release sheet as one embodiment of the present invention, which is obtained using the substrate for release sheet, is, for example, suitable as a release sheet to be used for an application in which it is not desired to affect an appearance of the transfer surface of an adherend onto which the shape formed by the convex portions included in the release agent layer (Z) is transferred and other characteristics of the adherend given by the appearance.

Therefore, the pressure sensitive adhesive sheet which is produced using the release sheet as one embodiment of the present invention can be suitably used for applications requiring air escape properties or an appearance, for example, discrimination use, decoration use, paint masking use, and surface protection use of metal plates or a glass substrates or the like. More specifically, the pressure sensitive adhesive sheet can be suitably used for painting-alternate tapes, marking films, and vehicle attachment tapes (for example, decorative tapes or blackout tapes for decorating the exterior or interior of an automobile).

In consequence, for the aforementioned reasons, the release sheet can be suitably used as a release sheet for pressure sensitive sheet to be used for the aforementioned various applications and a release sheet on the occasion of producing the pressure sensitive adhesive sheet.

Similarly, for the aforementioned reasons, the aforementioned substrate for release sheet can be suitably used as the substrate for release sheet to be used for release sheets to be used for the aforementioned various applications.

REFERENCE SIGNS LIST

10, 20, 30, 40: Substrate for release sheet
1: Support
2: Adhesion layer (X1)
3: Resin layer (Y1)
3$t$: Thickness of resin layer (Y1)
4: Adhesion layer (X2)
5: Resin layer (Y2)
6: Convex portion included in the resin layer (Y1)
6$h$: Difference in height of convex portions included in the resin layer (Y1)
6$w$: Width of convex portions included in the resin layer (Y1)
6$f$: Distance between feet of convex portions included in the resin layer (Y1)
6$p$: Pitch of convex portions included in the resin layer (Y1)
7: Concave portions included in the resin layer (Y1)
50: Release sheet
11: Release agent layer (Z)
12: Convex portion included in the release agent layer (Z)
13: Concave portion included in the release agent layer (Z)
14: Peeling trace generated on the resin layer (Y1)

The invention claimed is:

1. A substrate suitable for a release sheet, the substrate comprising, in this order:

a resin layer (Y2);

an adhesion layer (X2);

a support;

an adhesion layer (X1); and a resin layer (Y1) comprising a polyethylene having a density in a range of from 930 to 960 kg/m$^3$, wherein the support consists of a plastic film, wherein an absolute value of a difference between a first total thickness (Y1$t$+X1$t$) of the layer (Y1) and the layer (X1) and a second total thickness (Y2$t$+X2$t$) of the layer (Y2) and the layer (X2) is in a range of from 0 to 50 μm, wherein convex portions are present on a surface of the resin layer (Y1), wherein a difference in height of the convex portions is 0.5 μm or more, wherein a width of the convex portions is in a range of from 1.0 to 30.0 μm, wherein the support, the adhesion layer (X1), and the resin layer (Y1) are directly laminated, and wherein the support, the adhesion layer (X2), and the resin layer (Y2) are directly laminated.

2. The substrate of claim 1, wherein the adhesion layer (X1) comprises a polar site-comprising polyolefin.

3. The substrate of claim 2, wherein the polar site is derived from at least one selected from the group consisting of methacrylic acid, acrylic acid, methyl methacrylate, methyl acrylate, maleic acid, maleic anhydride, and vinyl acetate.

4. The substrate of claim 1, wherein the adhesion layer (X1) has a thickness in a range of from 1 to 50 μm.

5. The substrate of claim 1, wherein the difference in height of the convex portions is in a range of from 5.0 to 18.0 μm.

6. The substrate of claim 1, wherein an (X1)/(Y1) ratio of a thickness of the adhesion layer (X1) to a thickness of the resin layer (Y1) is in a range of from 0.02 to 10.00.

7. The substrate of claim 1, wherein the adhesion layer (X1) comprises a polyethylene having a density in a range of from 900 to less than 930 kg/m$^3$.

8. The substrate of claim 1, wherein the plastic film of the support consists of polyester.

9. The substrate of claim 1, wherein the plastic film of the support consists of polyethylene terephthalate, polybutylene terephthalate, and/or polyethylene naphthalate.

10. The substrate of claim 1, wherein the plastic film of the support consists of polyolefin.

11. The substrate of claim 1, wherein the plastic film of the support consists of polypropylene and/or polyethylene.

12. The substrate of claim 1, wherein the substrate consists of, in this order:

the resin layer (Y2);

the adhesion layer (X2);

the support;

the adhesion layer (X1); and the resin layer (Y1).

13. The substrate of claim 1, wherein the absolute value of the difference between the first total thickness (Y1$t$+X1$t$) and the second total thickness (Y2$t$+X2$t$) is in a range of from 0 to 10 μm.

14. The substrate of claim 1, wherein a width of the convex portions is in a range of from 5.0 to 30.0 μm.

15. The release sheet of claim 1, wherein a foot distance between the convex portions is in a range of from 150 to 2,000 μm.

16. A release sheet, comprising:

a release agent layer (Z) on the resin layer (Y1) on an opposite side to the support of the substrate of claim 1.

17. The release sheet of claim 16, wherein second convex portions are present on a second surface of the release agent layer (Z), and a difference in height of the second convex portions is 0.5 μm or more.

18. The release sheet of claim 16, wherein the release agent layer (Z) is a layer formed of a release agent, and wherein the release agent comprises a silicone-based resin, isoprene-based resin, butadiene-based resin, long-chain alkyl-based resin, long-chain alkyl acrylate-based resin, alkyd-based resin, or fluorine-based resin.

19. The release sheet of claim 16, wherein the release agent layer (Z) is a layer formed of a release agent, and wherein the release agent comprises a silicone-based resin.

20. A method for producing the substrate of claim 1, the method comprising:

forming a layer serving as the resin layer (Y1) comprising polyethylene having a density in a range of from 930 to 960 kg/m$^3$ comprising melt extrusion; and pressing the surface of the layer serving as the resin layer (Y1) onto a second surface of an embossing roll to form the convex portions on the surface, thereby forming the resin layer (Y1).

\* \* \* \* \*